United States Patent [19]
Clapsaddle

[11] 3,936,958
[45] Feb. 10, 1976

[54] SONAR REVERBERATION SIMULATION

[75] Inventor: Arthur B. Clapsaddle, Cockeysville, Md.

[73] Assignee: The United States of America as represented by the Secretary of the Navy, Washington, D.C.

[22] Filed: June 18, 1968

[21] Appl. No.: 740,815

[52] U.S. Cl. .............................................. 35/10.4
[51] Int. Cl.² ........................................... G09B 9/00
[58] Field of Search ..................................... 35/10.4

[56] References Cited
UNITED STATES PATENTS

| | | | |
|---|---|---|---|
| 2,881,535 | 4/1959 | Harwood et al. | 35/10.4 |
| 3,641,485 | 2/1972 | Murphree et al. | 35/10.4 X |
| 3,829,596 | 8/1974 | Murphree | 35/10.4 |

Primary Examiner—T. H. Tubbesing
Attorney, Agent, or Firm—R. S. Sciascia; J. W. Pease; H. A. David

[57] ABSTRACT

Simulation of sonar reverberation signals is accomplished from square pulses the timing and duration of which are computer determined by known principles by processing the pulses through novel shaper means including diode controlled charging and discharging of a capacitor through different selected resistances to provide appropriate ascent and descent curves to the pulses. The shaped pulses are then used to pulse modulate a doppler-shifted carrier signal which is generated by a voltage controlled oscillator responsive to control signals which are functions of ship's speed, transmission angle and the like. The resulting pulse modulated doppler-shifted carrier is then attentuated to provide the desired simulated reverberation signal components.

7 Claims, 4 Drawing Figures

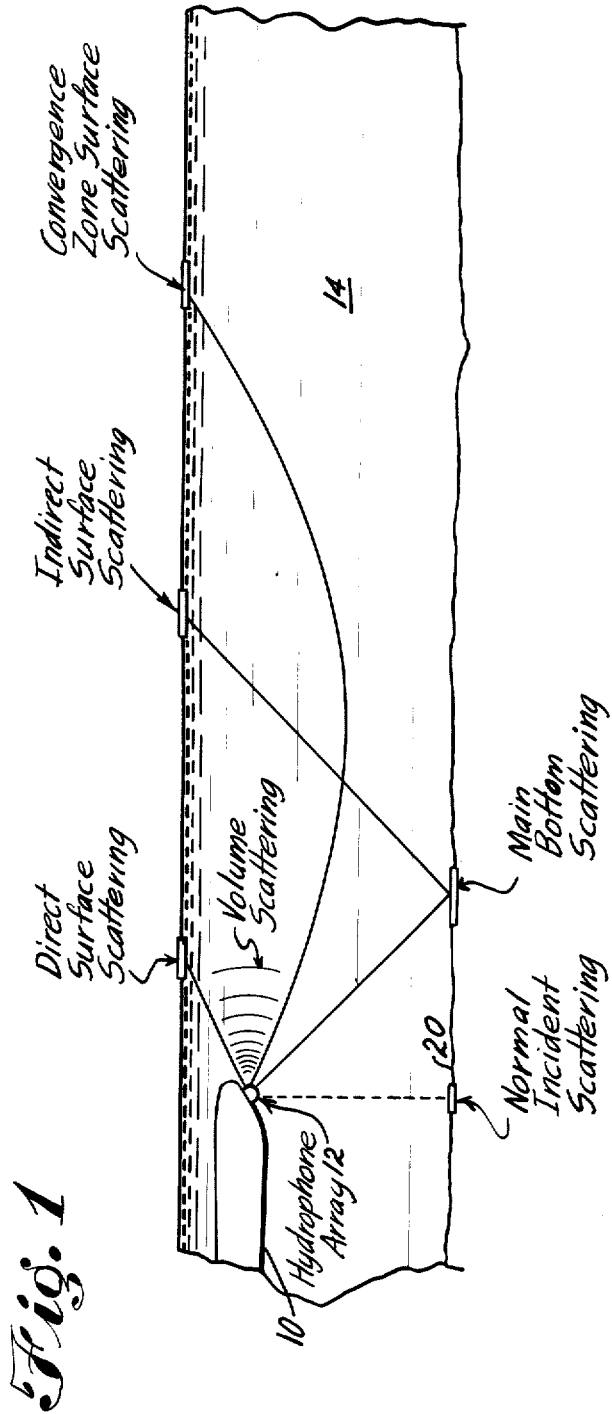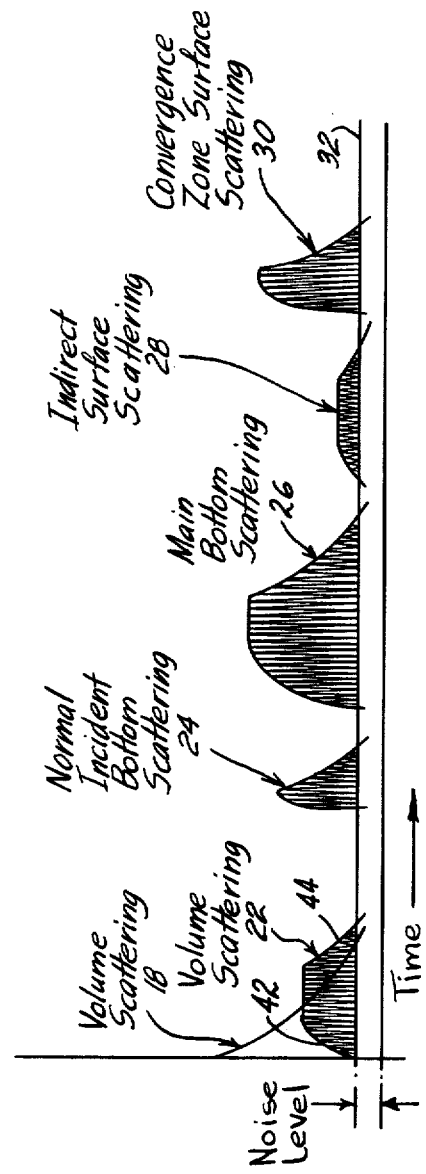

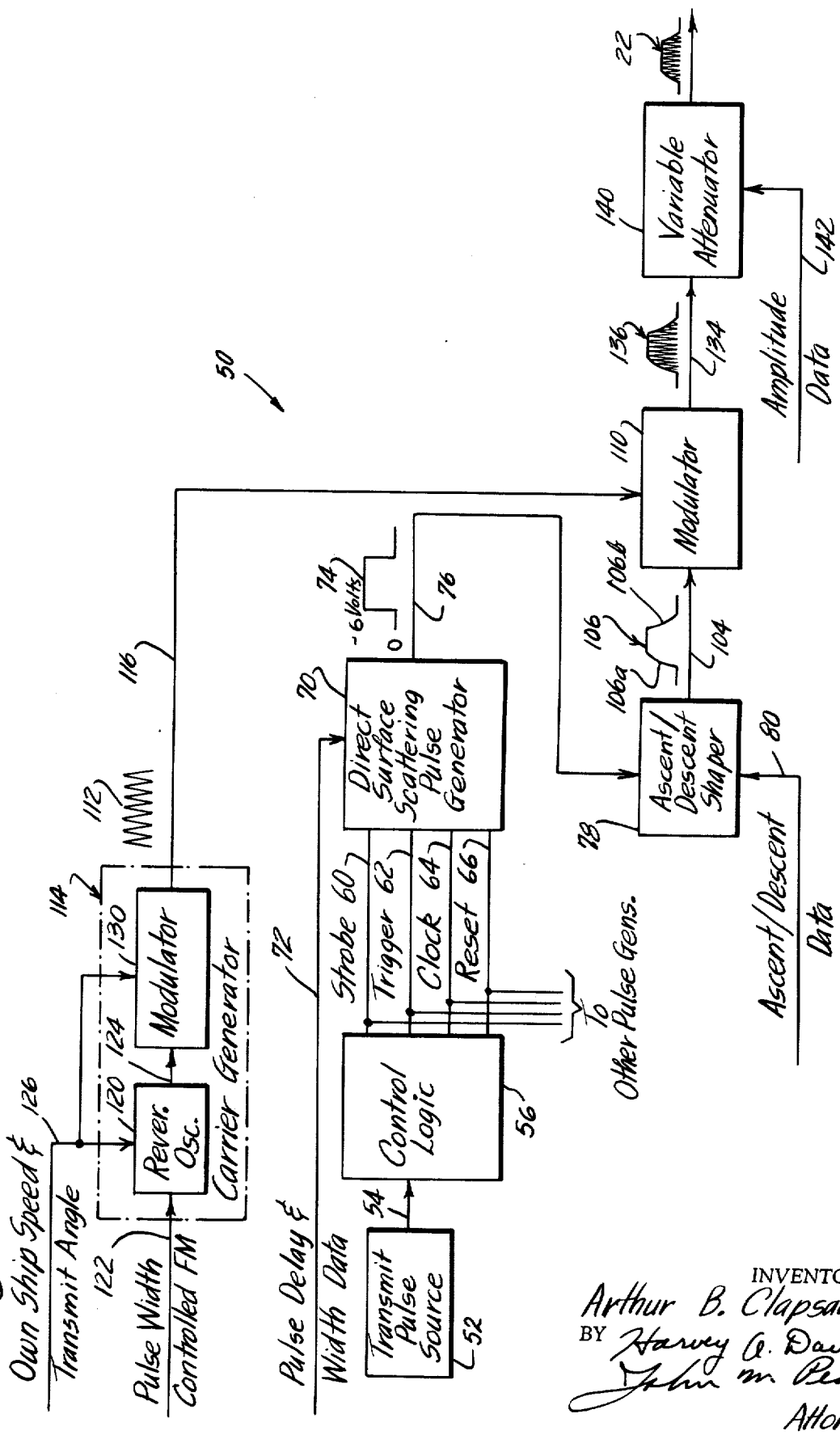

SONAR REVERBERATION SIMULATION

BACKGROUND OF THE INVENTION

This invention relates to sonar simulators for training purposes or the like, and more particularly to improved simulation of reverberation background noise resulting from an actively pinging sonar detecting-ranging set. This background noise consists of reflections of transmitted acoustic energy from the ocean bottom, ocean surface, and the ocean itself in the immediate vicinity of the hydrophones. The characteristics of each reflective component resulting from a single transmission, as well as the time relationship between the components, vary with the physical conditions of the situation. Each reverberation signal component consists of an envelope of audio frequency pulses, the shape and amplitude of which is a function of those physical conditions. In general, simulation of reflected sonar signals, either target or background, has been accomplished through systems including RC pulse shaping networks, timing means such as counters, attenuators, and oscillator means such as basic voltage controlled oscillators, in combination to produce the simulated sonar signals. Such systems have been notably complex and have usually required instructor controlled inputs.

SUMMARY OF THE INVENTION

With the foregoing in mind it is a primary object of this invention to provide an improved sonar reverberation simulator which is of relatively simple design, may be computer controlled, and provides a more realistic simulation of various components of background noise.

It is another object of this invention to provide an improved reverberation simulator wherein more realistic simulation is achieved through novel implementation and control of a voltage controlled oscillator for generating a doppler-shifted carrier frequency.

Still another object is the provision, in a reverberation simulator, of improved pulse shaping for producing carrier wave modulating pulses having more realistic ascent and descent curves than have been utilized heretofore.

BRIEF DESCRIPTION OF THE DRAWINGS

The invention may be further said to reside in certain novel constructions and arrangements of parts whereby the foregoing objects and advantages, as well as others, are achieved, as will become apparent from the following detailed description of a preferred embodiment when read in conjunction with the accompanying sheets of drawings forming a part of this specification, and in which:

FIG. 1 is a diagrammatic illustration of sonar reverberation geometry which leads to reverberation signals of the character which this invention simulates;

FIG. 2 is a graphic illustration of reverberation signal components showing characteristic shapes and amplitudes with respect to time, FIG. 3 is a block diagram illustrating reverberation generation according to the present invention.

DESCRIPTION OF THE PREFERRED EMBODIMENT

Figure 4:
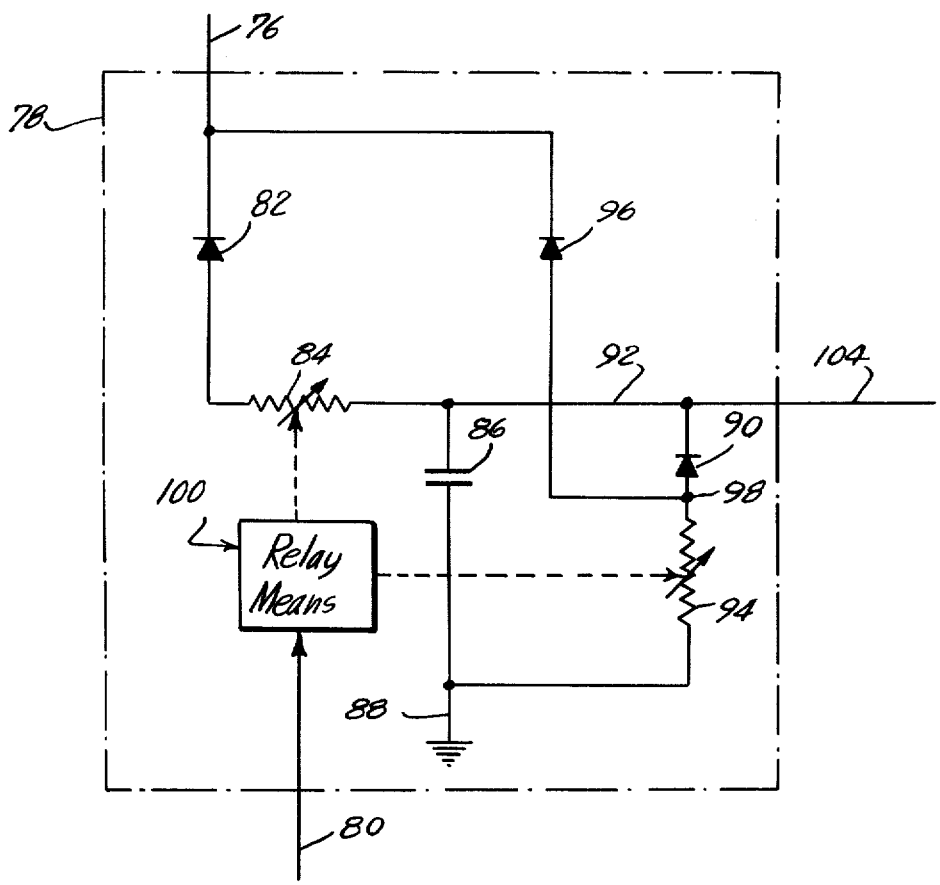
FIG. 4 is a schematic illustration of an ascent/descent shaper utilized in the reverberation generation of FIG. 3.

Referring to FIG. 1, a portion of a submarine vessel 10 is illustrated having a sonar projecting and receiving hydrophone array indicated generally at 12. A pulse of sonic energy transmitted into the water 14 may be considered to be either directional or omni-directional depending upon the mode of operation of the sonar equipment. Even in the directional mode, scattering of the energy results in a plurality of distinct, reflected reverberation component signals. Because the generation of reverberation component signals for the omnidirectional and directional modes is identical, the remainder of this specification will be understood to apply to either mode of operation. The characteristics of each component, illustrated in FIG. 2, as well as the time relation between components, vary with the simulated situation.

Thus, immediately ahead of the hydrophone array 12 is found volume scattering resulting in a return represented by curve 18 in FIG. 2. In addition, there are zones of normal incident scattering from the ocean bottom 20 directly below the hydrophone array, main bottom scattering, direct surface scattering, indirect surface scattering and convergence zone scattering, from which zones sonic energy is reflected to the hydrophone array to produce corresponding reverberation signal components 22, 24, 26, 28, and 30 of FIG. 2.

In addition to reverberation, background noise includes a more or less constant noise level 32 from other sources not pertinent to this description.

The signal components 22, 24, 26, 28, and 30 each consist of an envelope of audio frequency pulses, the shape and amplitude of which envelope is a function of the situation under which the reflection of energy occurred.

The shapes of the envelopes may be considered as comprising an ascent curve and a descent curve. For example, the envelope of signal component 22 has an ascent curve 42 and a descent curve 44. It will be noted that the ascent/descent curves of each of the signal components 22, 24, 26, 28, and 30 are similar but that these signal components differ mainly in amplitude and time duration. Moreover, each reverberation component (direct surface, main bottom, etc.) is received at the hydrophone array 12 a definite time after transmission, depending upon the path length traveled by the acoustic energy. This time may be quite short as in the case of volume reverberation, or quite long as in the case of the convergence zone component. The particular shapes and time delays appropriate to the individual reverberation components are simulated in a manner which will become apparent as this description proceeds.

Referring now to FIG. 3, apparatus for generation of reverberation signal components according to this invention is indicated generally at 50. The apparatus 50 comprises a source 52 of sonar transmit pulses which are conducted as indicated by flow line 54 to a control logic section 56. The source 52 may conveniently form part of a larger, overall sonar simulator apparatus of which the reverberation generating apparatus 50 is a component part. The transmit pulses herein referred to are not replicas of actual sonar transmissions, but rather are indications or signals of the times when the transmitter has been keyed.

The control logic section 56 provides timing signals in the form of strobe, trigger, clock, and reset signals via lines 60, 62, 64, and 66 to a direct surface scattering pulse generator 70. The pulse generator 70 is representative of the plurality of pulse generators which would be used, one for each reverberation signal component to be simulated. Inasmuch as the generation of each of the reverberation signal components 22, 24, 26, 28, and 30 is accomplished in the same manner, generation of only the direct surface scattering reverberation signal component 22 will be described.

Upon receipt of a transmit pulse signal from source 52 via line 54, the control logic section applies a strobe signal which presets counters in the pulse generators such as 70 with computed delay and reverberation pulse width data. This data is supplied from a simulation computer via flow line 72 and is characteristic of the situation being simulated. At some later time, a trigger signal is applied to the pulse generator 70, the later time being determined by the shortest possible time at which the type of reverberation signal component with which that pulse generator is concerned could be reflected back to the hydrophones array 12. The applied trigger signal enables the clock signals from the logic section 56 to drive the counter means in pulse generator 70. At a time after the trigger signal, which time is determined by the computed delay data, the pulse generator 70 provides a generally square output pulse 74 on line 76, the duration of which output pulse is determined by the computed reverberation pulse width data.

The pulse 74 is applied via line 76 to an ascent/descent shaper 78 which serves to shape the ascent and descent portions of the pulse in accordance with computer supplied ascent and descent data applied to the shaper 78 via flow line 80.

Referring to FIG. 4, the ascent/descent shaper 78 comprises a first diode 82 connected between line 76 and a first variable resistor means 84 which is in turn connected to one side of a capacitor 86. The other side of capacitor 86 is connected to ground potential at 88.

A second diode 90 is connected by line 92 to the other side of capacitor 86. The diode 90 is also connected, as illustrated, to a second variable resistor means 94 which is in turn connected to the other, grounded side of the capacitor. A third diode 96 is connected between line 76 and a junction 98 between the diode 90 and variable resistor 94.

The variable resistor means 84 and 94 are varied in their ohmic values by operation of relay means 100 under the control of ascent/descent data via line 80. The resistor means 84 is set to a value according to the ascent data and may be referred to as the ascent resistor means, while the resistor means 94 is set according to the descent data and may be referred to as the descent resistor means.

Now, when a negative pulse 74 from the pulse generator 70 is applied, via line 76, through diodes 82 and 96 to resistors 84 and 94, the capacitor 86 charges toward −6 volts through the ascent resistor means. While the capacitor 86 is charging, diode 90 is reverse-biased by the voltage appearing across resistor means 94, thereby preventing the capacitor from discharging through resistor means 94. When the duration of pulse 74 has ended, the diode 90 is no longer reverse-biased, and the capacitor 86 discharges through the descent resistor means 94.

The output of the shaper 78 is taken from the cathode of diode 90 (or from the ungrounded side of capacitor 86) via line 104 and is in the form of a shaped voltage pulse 106 having an ascent curve 106a and a descent curve 106b determined by the rates of charge and discharge of the capacitor 86. The pulse 106 is applied via line 104 to a modulator 110 wherein the pulse 106 is utilized to modulate a doppler shifted carrier signal 112 generated in a carrier generator 114 and applied to the modulator 110 via line 116.

The carrier generator 114 comprises a reverberation oscillator 120 which is a voltage controlled oscillator, preferably of the unijunction transistor relaxation oscillator type. The oscillator 120 operates around a predetermined center frequency, corresponding to the carrier frequency of the transmit pulses of the sonar being simulated, the actual frequency being modulated by pulse-width controlled FM (frequency modulation) applied via line 122. This pulse-width controlled FM is derived from a white noise source which is pulse-width modulated in accordance with pulse width characteristics of the sonar being simulated. The frequency of the reverberation oscillator output on line 124 is further under the control of an analog voltage signal representative of own ship speed and angle of transmission, this analog signal being applied via line 126. The resulting carrier frequency output on line 124 is simulative of doppler shifted frequency and is applied to a modulator 130 forming part of the carrier generator 114.

The modulator 130 effects amplitude modulation of the doppler shifted carrier signal from the oscillator 120 in accordance with the ship speed and transmission angle, thereby providing a realistic doppler shifted carrier signal 112 on line 116.

The modulator 110 pulse modulates the carrier signal 112 with the pulses 106, thereby providing as an output on line 134 signals such as 136 which consist of the doppler shifted carrier frequency within an envelope having the desired shapes in the ascent and descent curves. The modulator 110 is conveniently in the form of one of the well known photo-resistor types, and the input and output therefrom may be appropriately amplified as by emitter followers (not shown).

The output from the modulator 110 is applied via line 134 to a variable attenuator 140 which serves to attenuate the signal 136 in accordance with computer supplied amplitude data provided thereto on line 142. The attenuated output appears on line 144 in the form of the desired reverberation signal component 22. This signal component may then be combined in suitable summation means with other components such as 24, 26, etc., generated in the same manner as component 22, to form complete simulation of reverberation signals.

It is claimed:
1. A sonar reverberation signal generator for generating reverberation signal components comprised of a doppler-shifted carrier having an envelope characterized by predetermined ascent and descent curves, said generator comprising:
  a source of transmit pulses;
  logic means responsive to said transmit pulses and operative to provide timing signals;
  pulse generator means responsive to said timing signals to provide squared voltage pulses of predetermined duration;
  shaper means connected to receive said squared voltage pulses and to shape said pulses to provide shaped pulses having said predetermined ascent and descent curves;

carrier generator means for generating a simulated doppler shifted carrier signal;

modulator means connected to receive said carrier signal and said shaped pulses and operative to modulate the former with the latter to provide pulse modulated carrier signals having an envelope characterized by said ascent and descent curves; and attenuator means connected to receive said pulse modulated carrier signals and operative to reduce the amplitude thereof to provide said simulated reverberation signal components.

2. A sonar reverberation signal generator as defined in claim 1, and wherein said shaper means comprises:
   a capacitor;
   a first resistor means connected to one side of said capacitor, the other side of said capacitor being connected to ground potential;
   a first diode connected to said one side of said capacitor and to said pulse generator means, said first diode being oriented to pass said voltage pulses to charge said capacitor through said first resistor means;
   a second diode connected to pass said voltage pulses;
   a second resistor means connected at one side to said second diode and at the other side to said ground potential;
   a third diode connected between said one side of said capacitor and said one side of said second resistor means, said third diode being oriented to be reverse-biased by said second resistor means throughout the duration of said voltage pulses so as to block discharge of said capacitor through said second resistor means when so reverse-biased, and said third diode being operative to permit discharge of said capacitor through said second resistor means when the duration of each of said voltage pulses terminates; and
   means for connecting said one side of said capacitor to said modulator means for providing said shaped pulses thereto.

3. A sonar reverberation signal generator as defined in claim 1, and wherein said carrier generator means comprises:
   a voltage controlled oscillator operable at a predetermined center frequency, said oscillator being responsive to an analog voltage signal which is a function of ship's speed and angle of transmission to shift to a frequency off said center frequency.

4. A sonar reverberation signal generator as defined in claim 3, and wherein said carrier generator means further comprises modulator means connected to receive the output of said oscillator and responsive to said analog voltage signal to amplitude modulate said output of said oscillator so as to provide said carrier signals.

5. A sonar reverberation signal generator as defined in claim 3, and wherein said shaper means comprises:
   a capacitor;
   a first resistor means connected to one side of said capacitor, the other side of said capacitor being connected to ground potential;
   a first diode connected to said one side of said capacitor and to said pulse generator means, said first diode being oriented to pass said voltage pulses to charge said capacitor through said first resistor means;
   a second diode connected to pass said voltage pulses;
   a second resistor means connected at one side to said second diode and at the other side to said ground potential;
   a third diode connected between said one side of said capacitor and said one side of said second resistor means, said third diode being oriented to be reverse-biased by said second resistor means throughout the duration of said voltage pulses so as to block discharge of said capacitor through said second resistor means when so reverse-biased, and said third diode being operative to permit discharge of said capacitor through said second resistor means when the duration of each of said voltage pulse terminates; and
   means for connecting said one side of said capacitor to said modulator means for providing said shaped pulses thereto.

6. A sonar reverberation signal generator as defined in claim 4, and wherein said shaper means comprises:
   a capacitor;
   a first resistor means connected to one side of said capacitor, the other side of said capacitor being connected to ground potential;
   a first diode connected to said one side of said capacitor and to said pulse generator means, said first diode being oriented to pass said voltage pulses to charge said capacitor through said first resistor means;
   a second diode connected to pass said voltage pulses;
   a second resistor means connected at one side to said second diode and at the other side to said ground potential;
   a third diode connected between said one side of said capacitor and said one side of said second resistor means, said third diode being oriented to be reverse-biased by said second resistor means throughout the duration of said voltage pulses so as to block discharge of said capacitor through said second resistor means when so reverse-biased, and said third diode being operative to permit discharge of said capacitor through said second resistor means when the duration of each of said voltage pulses terminates; and
   means for connecting said one side of said capacitor to said modulator means for providing said shaped pulses thereto.

7. A sonar reverberation signal generator as defined in claim 2, and wherein:
   said first and second resistor means each comprise variable resistor means.

* * * * *